(12) United States Patent
Dohmann

(10) Patent No.: US 7,950,153 B2
(45) Date of Patent: May 31, 2011

(54) METHOD OF MANUFACTURING A STEERING RACK

(75) Inventor: Juergen Dohmann, Redfern (AU)

(73) Assignee: Bishop Innovation Limited, North Ryde, New South Wales (AU)

( * ) Notice: Subject to any disclaimer, the term of this patent is extended or adjusted under 35 U.S.C. 154(b) by 931 days.

(21) Appl. No.: 11/886,120

(22) PCT Filed: Mar. 21, 2006

(86) PCT No.: PCT/AU2006/000366
§ 371 (c)(1),
(2), (4) Date: Sep. 11, 2007

(87) PCT Pub. No.: WO2006/099661
PCT Pub. Date: Sep. 28, 2006

(65) Prior Publication Data
US 2008/0184833 A1    Aug. 7, 2008

(30) Foreign Application Priority Data

Mar. 23, 2005 (AU) ................................ 2005901424

(51) Int. Cl.
*B21D 53/88* (2006.01)
*B21D 41/00* (2006.01)
*B21D 15/00* (2006.01)
*B21K 21/16* (2006.01)

(52) U.S. Cl. .............. 29/897.2; 29/893.34; 29/DIG. 18; 72/370.13; 72/370.19

(58) Field of Classification Search ............... 29/893.34, 29/897, 897.2, DIG. 18; 72/370.13, 370.19, 72/370.03, 370.27, 370.01–370.05, 370.1, 370.23–370.26, 352–360, 76

See application file for complete search history.

(56) References Cited

U.S. PATENT DOCUMENTS

| | | | |
|---|---|---|---|
| 4,571,982 A | 2/1986 | Bishop et al. | |
| 4,722,216 A * | 2/1988 | Fencl | 72/402 |
| 5,231,916 A * | 8/1993 | Weiler | 92/172 |
| 5,628,222 A * | 5/1997 | Yasuda et al. | 72/192 |
| 5,862,701 A | 1/1999 | Bishop et al. | |
| 6,038,771 A * | 3/2000 | Takehara et al. | 29/897.2 |
| 6,289,710 B1 * | 9/2001 | Ozeki | 72/370.04 |
| 7,168,282 B2 * | 1/2007 | McLean | 72/356 |

(Continued)

FOREIGN PATENT DOCUMENTS

DE    40 06 038 A1    8/1991

(Continued)

*Primary Examiner* — David P Bryant
*Assistant Examiner* — Sarang Afzali
(74) *Attorney, Agent, or Firm* — Birch Stewart Kolasch & Birch, LLP

(57) ABSTRACT

A method of manufacturing a steering rack for a vehicle rack and pinion steering system. The rack comprises gear teeth and a shank that has a constant outside diameter and constant wall thickness over the majority of its length. The method comprises performing a forging operation on a tubular member with an elongate member positioned in the bore of a thickened region of the tubular member. The forging operation forms the gear teeth on the thickened region, and the elongate member is retained within the tubular member. The tubular member is made by performing a forming operation on a length of tube stock such that the outside diameter of the thickened region is smaller than the outside diameter of the shank, and the wall thickness of the thickened region is larger than the wall thickness of the shank.

21 Claims, 4 Drawing Sheets

U.S. PATENT DOCUMENTS

| | | | | |
|---|---|---|---|---|
| 7,168,284 B2 * | 1/2007 | Shiokawa | ................ | 72/370.06 |
| 7,225,541 B2 * | 6/2007 | Kubota | ................ | 29/897.2 |

FOREIGN PATENT DOCUMENTS

| | | |
|---|---|---|
| DE | 43 31 792 A1 | 3/1995 |
| DE | 199 01 425 A1 | 7/2000 |
| EP | 0 445 470 B1 | 7/1994 |
| EP | 0 572 105 B1 | 8/1997 |
| JP | 57-195960 A | 12/1982 |
| JP | 62-99261 A | 5/1987 |
| JP | 2000-16310 A | 1/2000 |
| JP | 2003-311366 A | 11/2003 |
| WO | WO-2005/053875 A1 | 6/2005 |

* cited by examiner

METHOD OF MANUFACTURING A STEERING RACK

TECHNICAL FIELD

The present invention relates to steering racks for vehicle rack and pinion steering gears, and more particularly to a method of manufacturing such racks from tube stock.

BACKGROUND

Typically, steering racks for vehicle rack and pinion steering gears are manufactured from round solid bar stock, with the toothed region broached across the bar near one end. This results in the cross section of the toothed region having a 'D' shape and hence these racks are commonly referred to as "D-racks". The toothed region of such a broached D-rack has significantly less bending strength than the round solid shank extending from it. However, to minimise the weight of the steering rack, it is desirable that the toothed region and the shank have similar bending strength. A common approach to this problem is to gun drill the shank over most of its length resulting in a substantially tubular shank. However, the disadvantages of gun drilling are that material is wasted and it is a relatively expensive process. A further disadvantage of broaching the toothed region of a rack is that broaching cannot produce variable ratio teeth.

An alternative method of manufacturing a steering rack from round solid bar stock is to forge the toothed region. U.S. Pat. Nos. 4,571,982 (Bishop) and 5,862,701 (Bishop et al) disclose die apparatus for flashless warm forging the toothed region to net shape. "Net shape" means that the forged rack teeth do not require any further machining after forging. An advantage of forging is that the rack teeth may be shaped to have a variable gear ratio. The cross section of the toothed region of racks forged by this type of die has a 'Y' shape and such racks are commonly referred to as "Y-racks". The toothed region of a forged Y-rack has greater bending strength than the toothed region of a D-rack broached from the same diameter solid bar, and so Y-racks can be forged from smaller diameter bar whilst maintaining overall bending strength. However, the shanks of Y-racks are still commonly gun drilled to further reduce weight.

WO 2005/053875 A1 (Bishop Innovation Limited) discloses a die apparatus for flashless forging D-racks from a solid bar. Unlike a typical Y-rack, the cross sectional area of the toothed region of a typical solid D-rack is less than the cross sectional area of its shank prior to gun drilling. This means that a typical D-rack cannot be flashless forged from bar stock of constant diameter. This problem may be overcome by forging the D-rack from a solid bar having a smaller diameter in the region where the teeth are to be forged.

A prior art solution to the problem of gun drilling the shank of a solid rack is a "composite rack", in which a solid toothed member is joined to a hollow shank by a joining method such as welding. Composite racks are potentially cost effective. However, there is some market resistance to a joint in a steering rack due to safety concerns.

Another alternative to gun drilling is disclosed in EP 0445470 B1 (Simon) in which a blank for a steering rack is made by extrusion from a short length of thick walled tube. The resulting hollow blank has a thick walled region on to which the teeth are cut and a region of thinner wall section for the shank. However, this method of a making a blank is not suitable for subsequent forging of the teeth, and hence not suitable for producing variable ratio teeth, because the hollow region where the teeth are to be formed is not suitable for use with the forging methods described above. DE 19901425 A1 (Umformtechnik Bauerle GmbH) discloses another method of making a hollow blank having a thickened region where the teeth are to be cut, but again it is not suitable for producing forged teeth.

Numerous attempts have been made to manufacture steering racks by forming tube stock. However, none of these methods have been widely used in mass production. A particular problem with manufacturing a steering rack directly from tube stock is that the teeth cannot be forged on to the tube unless the bore of the tube is supported against collapsing. Furthermore, the tube stock must have sufficient wall thickness to form teeth thereon, which may result in a tube thickness being chosen that is unnecessarily thick for the shank of the rack and therefore the rack as a whole is heavier than necessary. Forging methods have been proposed where a removable mandrel is placed in the bore of the tube stock during forging of the teeth. However, this method has a number of problems. The mandrel is difficult to remove after forging and the material must flow around the rigid mandrel.

Another method of forming a steering rack directly from tube involves firstly flattening one side of the tube then passing a series of mandrels through the flattened tube such that it is forced outwardly into a die to form the teeth. Such a method is disclosed in EP 0572105 B1 (Tube Forming Co Ltd). However, this method still suffers from the limitation that the tube must be of sufficient thickness to form the teeth. Furthermore, it is a relatively slow process and it is not well suited to producing variable ratio teeth that have large ratio changes.

A method of forging the teeth of a steering rack on to tube stock is disclosed in JP 57-195960A (Jidosha Kiki Co Ltd) in which a solid elongate member is positioned in the bore of a length of tube stock prior to forging. The solid elongate member supports the bore of the tube during forging and is retained in the tube as part of the finished steering rack. The method disclosed shows the teeth being forged on to tube stock having constant wall thickness. This means that the wall thickness must be sufficient to form the teeth on and therefore thicker than necessary for the shank of the rack, which results in a rack that is heavier than necessary. Furthermore, the solid elongate member cannot be relied upon to provide additional strength and support to the teeth forged on the tube. This is because the interface between the forged tube and the elongate member cannot transmit significant shear stress. The disclosure in this publication shows the teeth being forged on to a tube having a constant outside diameter, and as such it is not clear how the combined cross sectional area of the tube and the solid elongate member is reduced to that of the finished D-rack shown. A similar method is disclosed in JP 2000-016310 A (Kayaba Industry Co Ltd). In this disclosure, the elongate mandrel has a flat on one side to accommodate the reduction in cross sectional area required in the toothed region, but it still does not overcome the problem that the constant wall thickness tube stock shown in this disclosed method must have sufficient wall thickness to form teeth over its entire length.

The present invention seeks to provide a steering rack and a method of manufacture thereof that ameliorates at least some of the disadvantages of the prior art.

SUMMARY OF INVENTION

In a first aspect, the present invention consists of a method of manufacturing a steering rack for a vehicle rack and pinion steering system, said rack comprising gear teeth and a shank, said shank having a constant outside diameter and constant wall thickness over the majority of its length, said method comprising performing a forging operation on a tubular member with an elongate member positioned in the bore of a first region of said tubular member, said forging operation forming said gear teeth on said first region, thereby retaining said elongate member within said tubular member, characterised in that, prior to said forging operation, said tubular member is made by performing a forming operation on a length of tube stock such that the outside diameter of said first region is smaller than said constant outside diameter of said shank, and the wall thickness of said first region is larger than said constant wall thickness of said shank.

Preferably, said tubular member has at least one thickened region adjacent said first region, at least a portion of the outside diameter of said thickened region being substantially the same as said constant outside diameter of said shank, and at least a portion of the bore diameter of said thickened region being substantially the same as the bore diameter of said first region, said elongate member at least partially axially overlapping said thickened region. Preferably, said at least one thickened region comprises two thickened regions, adjacent opposite ends said first region.

Preferably, a portion of the bore of said thickened region is smaller in diameter than said elongate member thereby axially restraining said elongate member during said forging operation.

Preferably, a blind ended hole is pre-formed in an end of said elongate member, and, subsequent to said forging operation, a vent hole is drilled through the wall of said tubular member into said elongate member such that it communicates with said blind ended hole to form a vent passage.

Preferably, said forming operation is a swaging operation. Preferably, said first region is axially compressed during said swaging operation.

In one preferred embodiment, said elongate member is positioned in the bore of said tubular member prior to said swaging operation and said first region is swaged onto said elongate member. In another preferred embodiment, during said swaging operation, said first region is swaged onto a removable and reusable swaging mandrel.

In one preferred embodiment, the outside diameter of substantially the entire length of said tube stock is reduced by said forming operation.

In one preferred embodiment, said elongate member is positioned in the bore of said first region after said forming operation. In one preferred embodiment, said elongate member is a push fit in the bore of said first region. In another preferred embodiment, said elongate member is positioned in the bore of said first region by means of heating said first region to expand it, inserting said elongate member into the bore of said first region, then cooling said first region to shrink fit said elongate member in position.

Preferably, said elongate member is solid and substantially cylindrical with a diameter substantially equal to that of the bore of said first region.

Preferably, said thickened region is made by an upsetting operation. Preferably, said upsetting operation is performed after said first region has been formed and with said elongate member positioned in the bore of said first region.

Preferably, during said forging operation, said thickened region is gripped.

In one preferred embodiment, during said forging operation a forging mandrel extending through the bore of said tubular member resists axial extrusion of said elongate member.

Preferably, said forging operation is a warm forging operation.

Preferably, said steering rack is a D-rack.

Preferably, a portion of said tubular member forms said shank and said shank has a region of increased wall thickness that has a groove machined in its outside diameter adapted to locate a piston.

Preferably, an end of said tubular member has a region increased wall thickness into which an internal thread is machined, said thread being adapted to attach a tie rod.

In a second aspect, the present invention consists of a steering rack for a vehicle rack and pinion steering system manufactured by any of the above methods.

In a third aspect, the present invention consists of a steering rack for a vehicle rack and pinion steering system, comprising a tubular member having a toothed region formed by a forging operation, an elongate member positioned in the bore of said tubular member prior to said forging operation, said toothed region being axially between the ends of said elongate member, and a shank having a constant outside diameter and constant wall thickness over the majority of its length, characterised in that said toothed region is formed on a portion of said tubular member that has an outside diameter smaller than said constant outside diameter of said shank and a wall thickness larger than said constant wall thickness of said shank.

BEST MODE OF CARRYING OUT THE INVENTION

Figure 1:
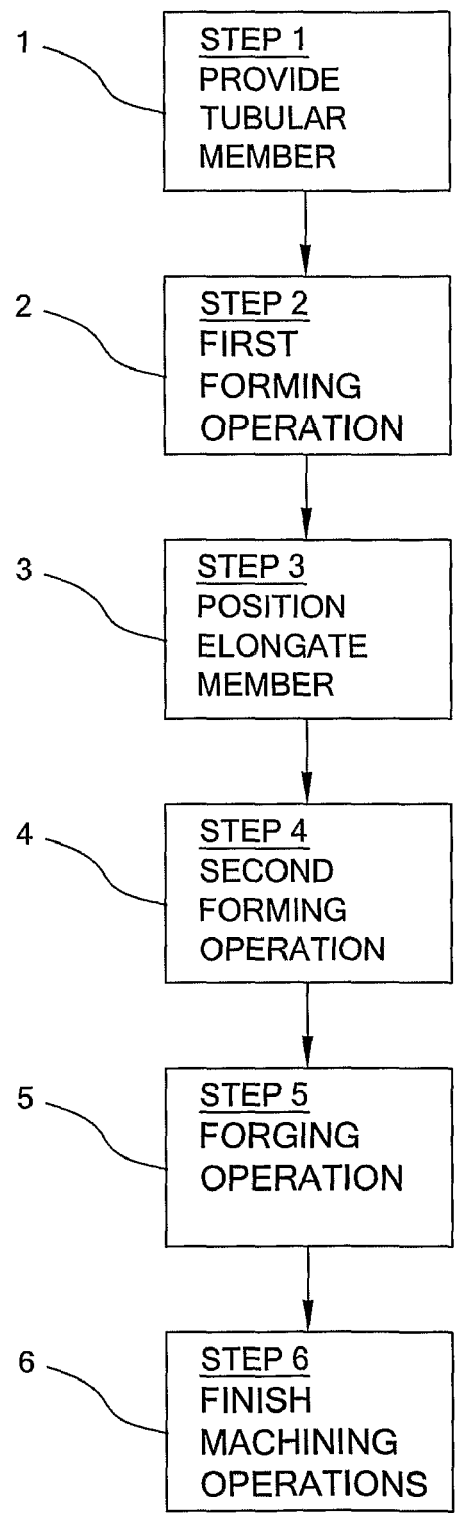
FIG. 1 schematically illustrates a first embodiment of a method of manufacturing a steering rack in accordance with the present invention.
Figure 9:
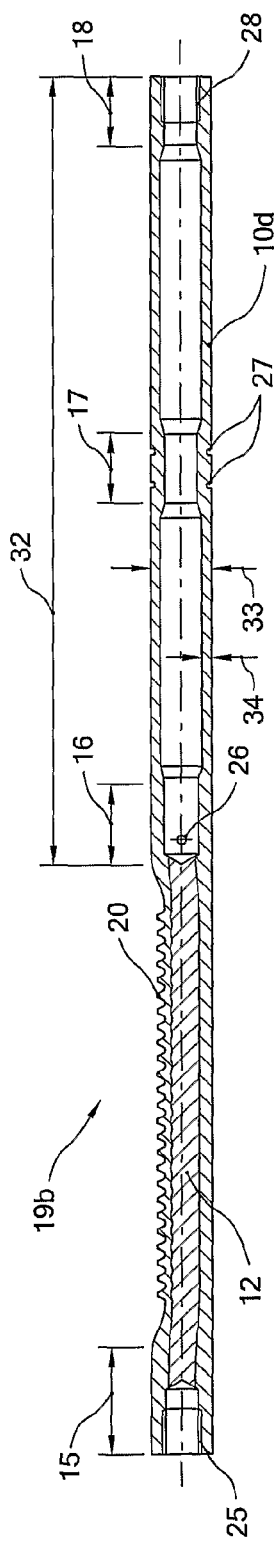
FIG. 9 depicts a finished steering rack manufactured by the method of the present invention.

FIG. 1 schematically illustrates a method of manufacturing steering rack 19b, shown in FIG. 9, in accordance with the present invention comprising steps 1 to 6. Steering rack 19b comprises gear teeth 20 and a tubular shank 32. Shank 32 has a constant outside diameter 33 and constant wall thickness 34 over the majority of its length.

Figure 2:
FIG. 2 depicts a length of tube stock used to manufacture a steering rack in accordance with the present invention.

Step 1 comprises providing a length of tube stock 10a as shown in FIG. 2 having a constant outside diameter substantially equal to outside diameter 33 of shank 32, and a constant wall thickness substantially equal to wall thickness 34 of shank 32.

Figure 3:
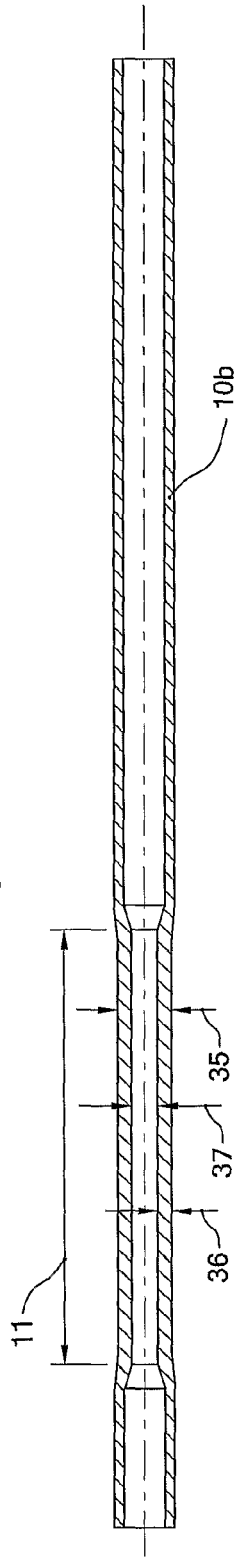
FIG. 3 depicts a formed tubular member produced by forming the tube stock of FIG. 2.

Step 2 comprises performing a first forming operation on tube stock 10a to produce a formed tubular member 10b as shown in FIG. 3. Formed tubular member 10b has a region 11 of increased wall thickness 36, reduced bore diameter 37 and reduced outside diameter 35 produced by the forming operation. The outside diameter 35 of region 11 is smaller than the outside diameter 33 of shank 32, and the wall thickness 36 of region 11 is larger than the wall thickness 34 of shank 32. Preferably the forming operation is a rotary swaging operation, and preferably the swaging operation is performed cold. The forming operation may comprise swaging alone, however in this embodiment, region 11 is subject to a superimposed upsetting operation whereby region 11 is axially compressed during the swaging operation to further increase its wall thickness of above that naturally achieved by the reduction of outside diameter by the swaging operation. If region 11 is axially compressed during the swaging operation then region 11 may need to be locally heated to allow this additional deformation to occur in a controlled manner. The axial compression of region 11 results in formed tubular member 10b being shorter than tube stock 10a. Preferably region 11 is swaged on to a removable and reusable precision made hardened steel mandrel such that the diameter of the bore of region 11 is accurately controlled. Rotary swaging is well known in the art of forming tubular components. The wall thickness and diameter of tubular member 10b adjacent each end of region 11 blends to that of tube stock 10a.

Alternatively, the forming operation used to form region 11 of increased wall thickness and reduced bore diameter may comprise an upsetting operation alone, performed either hot or cold. Still alternatively, the forming operation may comprise a sequence of swaging and upsetting operations. For example, tube stock 10a may first be upset to form a region of increased wall thickness and reduced bore diameter with its outside diameter remaining the same as tube stock 10a, and then this region may be rotary swaged to reduce its outside diameter.

Figure 4:
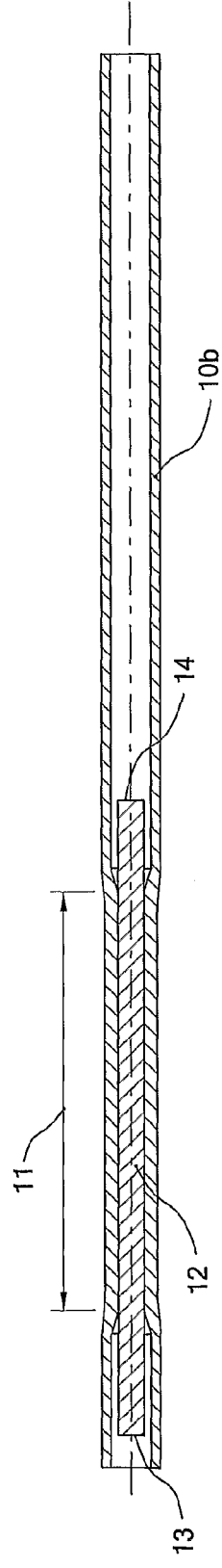
FIG. 4 depicts the formed tubular member of FIG. 3 with a solid elongate member positioned therein.

Step 3 comprises positioning a solid elongate member 12 in the form of a length of solid cylindrical steel bar in the bore of region 11 of formed tubular member 10b as shown in FIG. 4. The diameter of elongate member 12 is substantially equal to the bore diameter 37 of region 11. Preferably elongate member 12 is sized to have a small amount of interference with the bore of region 11 such that it is a push fit into the bore of region 11. This maintains the position of elongate member 12 during subsequent operations. Alternatively, elongate member 12 may be shrink fit in the bore of region 11 by heating region 11 to expand it, inserting elongate member 12, then cooling region 11. Elongate member 12 is longer than region 11 and is positioned such that its ends 13, 14 extend beyond region 11. Preferably elongate member 12 is made from substantially the same grade of steel as tube stock 10a to minimise the potential for corrosion caused by dissimilar metals being in contact with each other.

Figure 5:
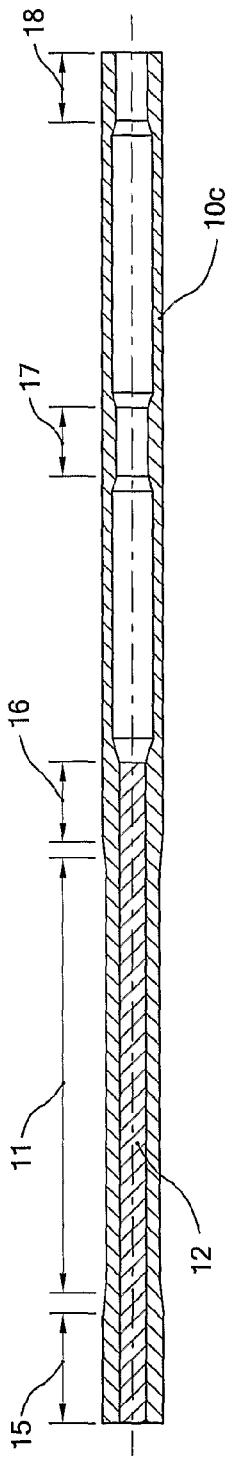
FIG. 5 depicts an upset and formed tubular member produced by upsetting the formed tubular member of FIG. 4.

Step 4 comprises performing a second forming operation by means of an upsetting operation on tubular member 10b to form upset and formed tubular member 10c as shown in FIG. 5 having thickened regions 15, 16, 17 and 18 of increased wall thickness and reduced bore diameter. The outside diameter of these regions is not substantially altered by the upsetting operation and tubular member 10b is locally heated by induction at these regions to enable them to be upset. Upsetting operations of this type are well known in the art of forming tubular components.

Thickened regions 15 and 16 are adjacent opposite ends of region 11 and each of these regions is upset to the extent that its bore diameter is reduced to the bore diameter of region 11, which is substantially equal to the outside diameter of elongate member 12. The outside diameter of thickened regions 15 and 16 is substantially the same as the outside diameter 33 of shank 32. Elongate member 12 axially overlaps thickened regions 15 and 16. The localised heating of regions 15 and 16 prior to upsetting may provide an interference fit between these regions and elongate member 12 due to these regions shrinking due to cooling after upsetting. This interference may assist to restrain elongate member 12 during the subsequent forging operation. Thickened region 18 is at the opposite end of tubular member 10c to thickened region 15, and thickened region 17 is approximately midway between thickened regions 16 and 18. This second forming operation may alternatively comprise other forming methods, such as swaging.

Figure 6:
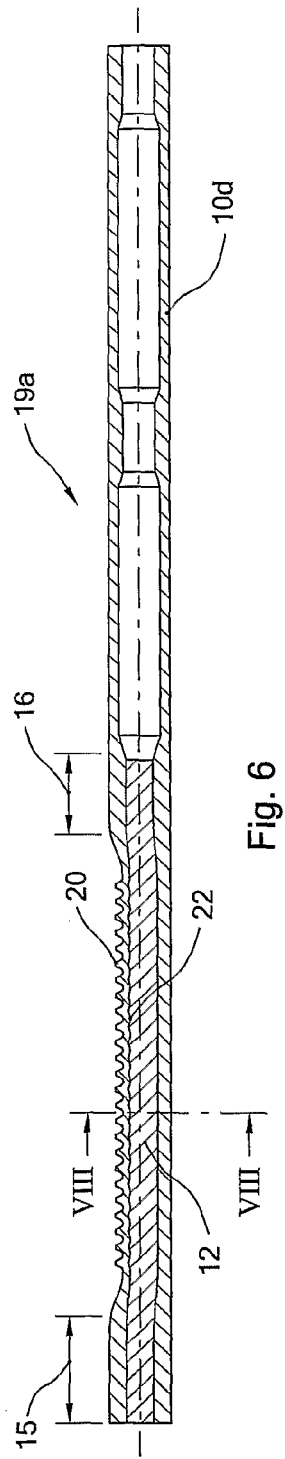
FIG. 6 depicts a steering rack forged from the upset and formed tubular member of FIG. 5.
Figure 7:
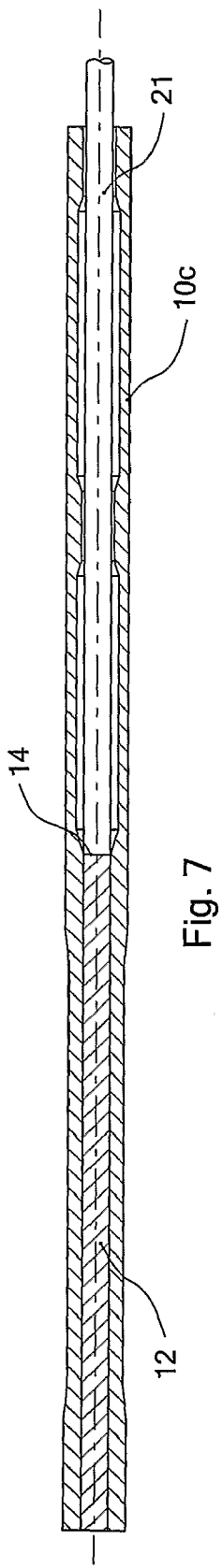
FIG. 7 depicts a forging mandrel inserted into the bore of the tubular member of FIG. 5.

Step 5 comprises forging tubular member 10c, with elongate member 12 positioned therein, to produce forged steering rack 19a shown in FIG. 6. Rack 19a is a D-rack. Region 11 and elongate member 12 are heated to a temperature suitable for warm forging, and then region 11 is flashless warm forged in a suitable die apparatus to produce teeth 20 thereon. Flashless warm forging may be performed using a die apparatus such as disclosed in WO 2005/053875 A1 (Bishop Innovation Limited). Warm forging is typically performed with the component heated to between 500° C. and 900° C. Preferably, the die apparatus solidly grips thickened regions 15 and 16 during the forging operation to minimise axial extrusion of elongate member 12 and properly support tubular member 10c. Prior to the forging operation, the outside diameter of region 11 may be sized by a machining operation such as grinding or turning. To further support elongate member 12 against axial extrusion during the forging operation, a removable forging mandrel 21 as shown in FIG. 7 may be inserted into the bore of tubular member 10c and preloaded against end 14 of elongate member 12 during the forging operation.

The bore of forged tubular member 10d under teeth 20 is deformed by the forging operation such that the portions of the bore under the roots of teeth 20 deform further inwards than the portions of the bore under the tips of teeth 20 thus forming a shallow ripple shape 22 as shown in FIG. 6. A corresponding ripple shape is also formed on deformed elongate member 12 thereby assisting to permanently retain elongate member 12 inside forged tubular member 10d.

Figure 8:
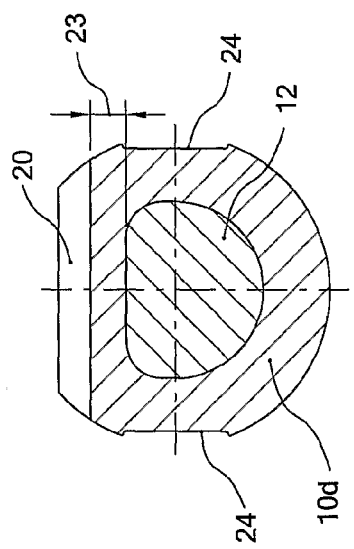
FIG. 8 is a cross section through VIII-VIII of the toothed region of the forged steering rack of FIG. 6.

FIG. 8 shows a cross section through the toothed region of forged steering rack 19a. Elongate member 12 has been flattened by the forging operation, which assists in maintaining adequate wall thickness 23 under teeth 20 to ensure teeth 20 have sufficient strength. The combination of region 11 and elongate member 12 behave in a similar manner during the forging operation as an equivalent single solid bar. Longitudinal indents 24 running either side of the toothed region are formed as a result of using a die apparatus as disclosed in WO 2005/053875 A1 (Bishop Innovation Limited). The forging operation may use other types of die apparatus that do not result in indents 24 or that produce different toothed region cross sections.

It is important to note that it is the thickened region 11 produced by the forming operation that allows teeth 20 of adequate size and strength to be forged. If a rack was forged from a tube of constant wall thickness then its entire length would need to have the wall thickness of region 11, resulting in an unnecessarily heavy rack.

FIG. 9 shows finished rack 19b produced by performing various machining operations on forged rack 19a. The end of elongate member 12 extending in to thickened region 15 is partially drilled out and a internal thread 25 machined in the bore of region 15 for attachment of a tie rod. The end of elongate member 12 extending into thickened region 16 is drilled out to provide a vent path between vent hole 26, drilled through the wall of forged tubular member 10d, and the bore of the shank 32 of rack 19b. Thickened region 17 is approximately midway along the portion of tubular member 10d that forms shank 32. Two circumferential grooves are machined on the outside of thickened region 17 adapted to locate a hydraulic piston. An internal thread 28 is machined in the bore of thickened region 18, at the end of tubular member 10d, for attachment of a tie rod. Provision of thickened regions 15, 17 and 18 at locations where features are required to be machined on rack 19b minimises the required wall thickness of tube stock 10a and hence minimises the weight of rack 19b. The local thickening provided by these regions means that the features machined thereon do not locally weaken rack 19b.

Figure 10:
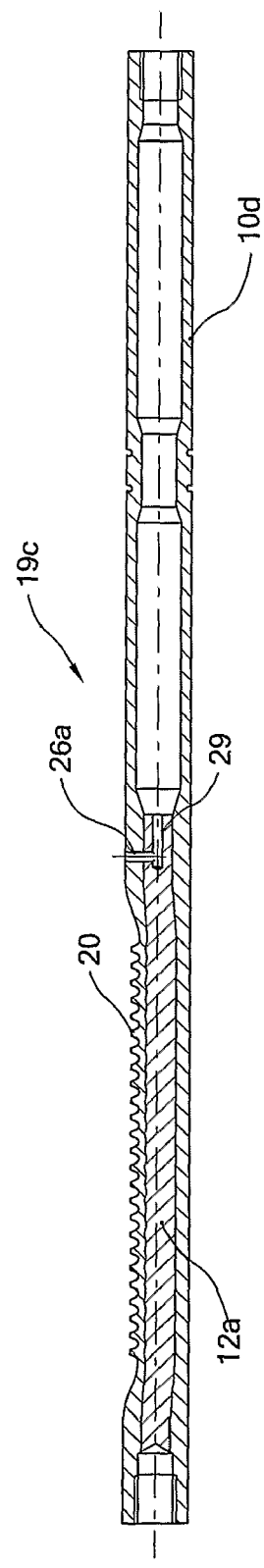
FIG. 10 depicts a steering rack manufactured by a second embodiment of the method of the present invention.

FIG. 10 depicts a steering rack manufactured by a second embodiment of the method of the present invention. Finished steering rack 19c is the same as that depicted in FIG. 9 except that the end of solid elongate member 12a facing the shank of rack 19c has a blind ended pre-formed hole 29. Hole 29 is drilled in the end of elongate member 12a before it is positioned in the bore of formed tubular member 10b. Hole 29 is small enough in diameter such that it does not collapse during the forging operation. After the forging operation, vent hole 26a is drilled through the wall of tubular member 10d into elongate member 12a such that it intersects and communicates with hole 29 to form a vent passage.

Figure 11:
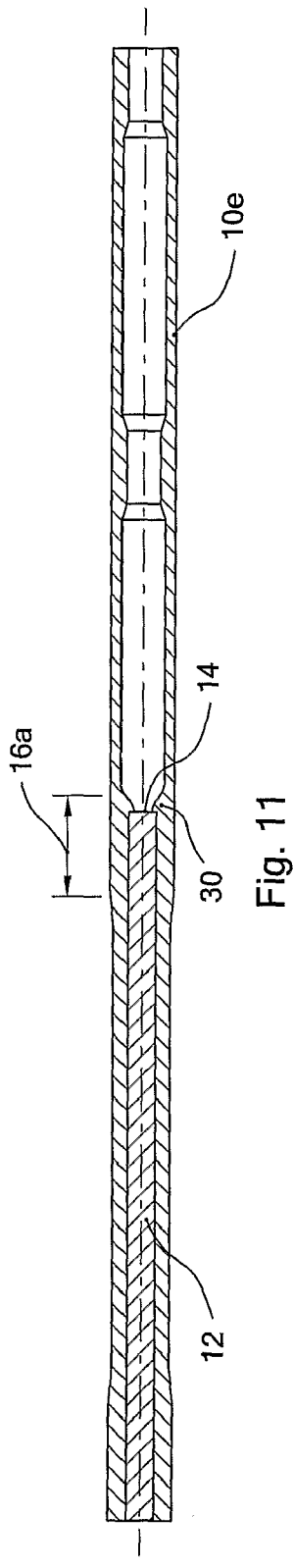
FIG. 11 depicts an upset and formed tubular member of a third embodiment of the method of the present invention.

FIG. 11 depicts an upset and formed tubular member of a third embodiment of the method of the present invention. Upset and formed tubular member 10e is the same as upset and formed tubular member 10c shown in FIG. 5 except that thickened region 16a extends beyond end 14 of elongate member 12, and during the upsetting operation a portion 30 of the bore of thickened region 16a is upset around end 14 of elongate member 12. The inside diameter of portion 30 is smaller than the outside diameter of elongate member 12 and therefore portion 30 axially restrains elongate member 12 during the subsequent forging operation, thereby reducing the need for removable forging mandrel 21 to support the end of elongate member 12.

In another not shown embodiment, elongate member 12 may be inserted into the bore of tube stock 10a prior to the swaging operation of step 2, instead of after it. The elongate member is then retained within the tubular member for subsequent operations. The elongate member may be smaller in diameter than the bore of the tube stock, in which case the tube stock is swaged onto elongate member 12, which effectively acts as a mandrel for the swaging operation. Alternatively, the elongate member may initially have the same diameter as the bore of the tube stock, in which case the cross sectional area of the elongate member is also reduced during the swaging operation and the length of the swaged region increases during the swaging operation. However, starting with an elongate member the same diameter as the bore of the tube stock has the disadvantage of reducing the amount of wall thickness increase of the tube stock that occurs during swaging. The advantage of starting with the elongate member the same diameter as the bore is that it is easier to position and hold the elongate member in the tube stock prior to the swaging operation.

In another not shown embodiment, the outside diameter of tube stock 10a may be larger than the shank diameter of the finished rack. In this case, the outside diameter of the entire length of tube stock 10a is reduced during the swaging operation of step 2, with the outside diameter of region 11 being reduced further than the remainder of tube stock 10a.

In another not shown embodiment, the forming operation of step 2 and the upsetting operation of step 4 may be combined into a single forming operation performed on tube stock 10a whereby both thickened region 11 and thickened regions 15, 16, 17 and 18 are formed by a single rotary swaging operation. In this case, elongate member 12 is positioned in the tubular member after this combined forming operation.

The term "comprising" as used herein is used in the inclusive sense of "including" or "having" and not in the exclusive sense of "consisting only of".

The invention claimed is:

1. A method of manufacturing a steering rack for a vehicle rack and pinion steering system, said rack comprising gear teeth and a shank, said shank having a constant outside diameter and constant wall thickness over the majority of its length, said method comprising performing a forging operation on a tubular member with an elongate member positioned in the bore of a first region of said tubular member, said forging operation forming said gear teeth on said first region, thereby retaining said elongate member within said tubular member, characterised in that, prior to said forging operation, said tubular member is made by performing at least one forming operation on a length of tube stock such that the outside diameter of said first region is smaller than said constant outside diameter of said shank, and the wall thickness of said first region is larger than said constant wall thickness of said shank, and said tubular member has at least one thickened region adjacent said first region, at least a portion of the outside diameter of said thickened region being substantially the same as said constant outside diameter of said shank, and at least a portion of the bore diameter of said thickened region being substantially the same as the bore diameter of said first region, said elongate member at least partially axially overlapping said thickened region.

2. A method of manufacturing a steering rack as claimed in claim 1 wherein said forming operation is a swaging operation.

3. A method of manufacturing a steering rack as claimed in claim 2 wherein said first region is axially compressed during said swaging operation.

4. A method of manufacturing a steering rack as claimed in claim 2 wherein said elongate member is positioned in the bore of said tubular member prior to said swaging operation and said first region is swaged onto said elongate member.

5. A method of manufacturing a steering rack as claimed in claim 2 wherein during said swaging operation, said first region is swaged onto a removable and reusable swaging mandrel.

6. A method of manufacturing a steering rack as claimed in claim 1 wherein said elongate member is positioned in the bore of said first region after said forming operation.

7. A method of manufacturing a steering rack as claimed in claim 6 wherein said elongate member is a push fit in the bore of said first region.

8. A method of manufacturing a steering rack as claimed in claim 6 wherein said elongate member is positioned in the bore of said first region by means of heating said first region to expand it, inserting said elongate member into the bore of said first region, then cooling said first region to shrink fit said elongate member in position.

9. A method of manufacturing a steering rack as claimed in claim 1 wherein said thickened region is made by an upsetting operation.

10. A method of manufacturing a steering rack as claimed in claim 9 wherein said upsetting operation is performed after said first region has been formed and with said elongate member positioned in the bore of said first region.

11. A method of manufacturing a steering rack as claimed in claim 1 wherein said at least one thickened region comprises two thickened regions, adjacent opposite ends of said first region.

12. A method of manufacturing a steering rack as claimed in claim 1 wherein a portion of the bore of said thickened region is smaller in diameter than said elongate member thereby axially restraining said elongate member during said forging operation.

13. A method of manufacturing a steering rack as claimed in claim 1 wherein a blind ended hole is pre-formed in an end of said elongate member, and, subsequent to said forging operation, a vent hole is drilled through the wall of said tubular member into said elongate member such that it communicates with said blind ended hole to form a vent passage.

14. A method of manufacturing a steering rack as claimed in claim 1 wherein the outside diameter of substantially the entire length of said tube stock is reduced by said forming operation.

15. A method of manufacturing a steering rack as claimed in claim 1 wherein said elongate member is solid and substantially cylindrical with a diameter substantially equal to that of the bore of said first region.

16. A method of manufacturing a steering rack as claimed in claim 1 wherein during said forging operation, said thickened region is gripped.

17. A method of manufacturing a steering rack as claimed in claim 1 wherein during said forging operation a forging mandrel extending through the bore of said tubular member resists axial extrusion of said elongate member.

18. A method of manufacturing a steering rack as claimed in claim 1 wherein said forging operation is a warm forging operation.

19. A method of manufacturing a steering rack as claimed in claim 1 wherein said steering rack is a D-rack.

20. A method of manufacturing a steering rack as claimed in claim 1 wherein a portion of said tubular member forms said shank and said shank has a region of increased wall thickness that has a groove machined in its outside diameter adapted to locate a piston.

21. A method of manufacturing a steering rack as claimed in claim 1 wherein an end of said tubular member has a region increased wall thickness into which an internal thread is machined, said thread being adapted to attach a tie rod.

* * * * *